Patented Oct. 17, 1922.

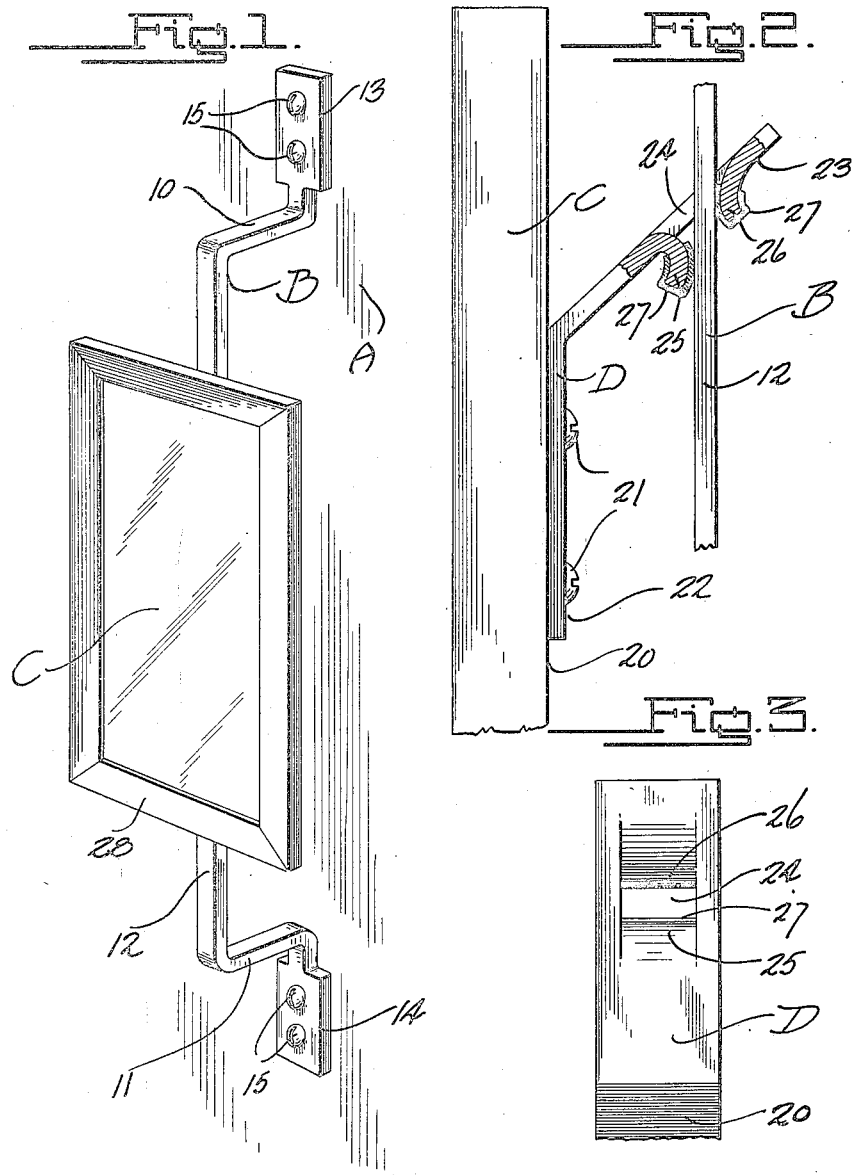

1,432,206

UNITED STATES PATENT OFFICE.

ORREN C. POOLE, JR., OF AUBURNDALE, MASSACHUSETTS.

ADJUSTABLE SUPPORT FOR MIRRORS.

Application filed February 18, 1921. Serial No. 445,994.

*To all whom it may concern:*

Be it known that I, ORREN C. POOLE, Jr., a citizen of the United States, residing at Auburndale, in the county of Middlesex and State of Massachusetts, have invented certain new and useful Improvements in Adjustable Supports for Mirrors, of which the following is a specification.

This invention relates to adjustable supports for maintaining mirrors and the like in a desired position.

The primary object of the invention is the provision of a mirror support, which can be conveniently and quickly adjusted as to height; thus eliminating much of the inconvenience incident to the ordinary type of mirror, placed at a predetermined fixed height and ordinarily only accessible to persons of approximately the height at which the mirror is placed.

A further object of the invention is the provision of an adjustable mirror support of the above described character, which can be adjusted by a single move, the mirror assuming the desired position by force of its own weight.

A further object of the invention is the provision of a device of the above described character, which is simple in construction, economical to manufacture, and one which can be effectively installed in hotels, churches, schools, hospitals, theaters and buildings of similar character, where persons of varying height use the mirrors placed therein.

Other objects and advantages will be apparent during the course of the following detailed description:

In the accompanying drawings forming a part of this specification, and in which similar reference characters designate corresponding parts throughout the several views:

Figure 1 is a perspective view of the improved adjustable support having a mirror attached thereto.

Figure 2 is a fragmentary enlarged section of the improved adjustable support, showing the details of construction.

Figure 3 is a fragmentary plan view of a detail of the adjustable support.

In the drawings, wherein for the purpose of illustration is shown the preferred embodiment of my invention; the letter A designates a stationary support, such as a wall, door, or the like, having the stationary guide rod or support B detachably connected thereto; the letter C designates a mirror of any approved type having the adjustable bracket D detachably mounted thereon, and which bracket is adapted to adjustably engage the guide rod B as will hereinafter be more fully set forth.

As mirrors, such as the mirror C are ordinarily positioned upon walls, doors, or the like, the stationary support A may of course, be any wall or the like, which is convenient for placing a mirror upon.

The stationary guide rod or support B is substantially U-shaped in formation, comprising the spacing legs 10 and 11, connected by the supporting rod 12. The legs 10 and 11 have outwardly extending ends 13 and 14 respectively, which lie substantially parallel with the rod 12 and are in reality adapted to engage the support A, suitable apertures being provided therein for receiving nails or screws 15, for detachably securing the guide rod B in fixed position upon the support A. Since the legs 10 and 11, and the rod 12, can be relatively small in cross section, the ends 13 and 14 can be enlarged for the purpose of receiving the attaching means C. It is preferred, that the rod 12 be elongated, and of sufficient length to approximate the mean difference between a tall person and a short person, according to the nature of the personnel ordinarily using the mirror.

The mirror C is of course, of ordinary construction, and is of that type commonly found in buildings and places of the character hereinbefore set forth.

The adjustable bracket D is detachably mounted upon the rear 20 of the mirror C as by screws 21 or the like, engaging the mirror abutting leg 22 of the bracket D. The mirror C is provided with a projecting arm 23 integral with the leg 22, and having the plane thereof disposed at an obtuse angle to the plane as defined by the leg 22. Thus when the leg 22 is attached upon the rear of the mirror C, as shown in Figure 2 of the drawings, the arm 23 projects outwardly and upwardly from the rear 20 of the mirror.

The arm 23 of the adjustable bracket D is provided adjacent the free end thereof with an aperture 24, and which aperture 24 is adapted to receive the rod 12 of the stationary guide B. The aperture 24, is preferably rectangular in formation and is so struck in the arm 23 that the metal stamped therefrom is down-turned, in direction of the leg 22, to provide rigid jaws 25 and 26 upon opposite sides of the rectangular aperture 24. It is preferred that the jaws 25 and 26 be uniformly curved, to present convexed gripping surfaces to the bar 12.

In order to protect the mirror C from damage, liable to occur because of any undue shock or careless handling of the device, the resilient grips 27 are positioned upon each of the jaws 25 and 26, and adapted to overlie the convex faces thereof, whereby upon operation of the device, the sleeves 27 will normally engage the bar 12 and absorb any shock incident to careless handling. The sleeve 27 may be of rubber or any similar resilient material, which can effectively maintain a frictional grip upon the bar 12.

Upon proper assemblage of the device as hereinbefore set forth, it will be noted, from Figure 2 of the drawings, that the jaw 26 is disposed upwardly of the jaw 25, with respect to the horizontal. In this position the mirror C will be vertical and in parallel relation with the guide rods 12; and due to gravitation, force of weight of the mirror C will tend to cause rotation thereof due to the pivoting action of the bar 12 in the aperture 24, and as a natural consequence the jaws 25 and 26 will be forced into gripping engagement with the bar 12.

From the foregoing, it can readily be seen that a person can adjust the mirror C upon the stationary guide support B in any convenient position by a single movement; this movement constituting the outward movement of the lower part 28 of the mirror C sufficient to disengage the jaws 25 and 26 and upon which movement, the mirror C can be adjusted upwardly or downwardly, as desired, to suit the height of the person using the same. Upon dropping or letting go of the mirror C, the same will assume the fixed position upon the bar 12, due to the frictional engagement thereof by the resilient sleeves 27 placed upon the jaws 25 and 26.

Various changes in the shape, size, and arrangement of parts, may be made to the form of the invention herein shown and described, without departing from the spirit of the invention or scope of the claims.

I claim:

1. In an adjustable support, the combination with a mirror, of a stationary guide rod; and a bracket, said bracket including an arm for engaging said mirror, and a second arm disposed at an obtuse angle to the axis of said first mentioned arm, said second arm having arcuate shaped gripping jaws thereon adapted for adjustably engaging said guide rod, to maintain said mirror in adjustably supported position upon said guide rod and under its own weight.

2. In a device of the class described, the combination with an article to be supported, of a stationary guide member, and a bracket having said article connected thereon, and provided with an opening therein remote from the connection thereof with said article for receiving the guide member therethrough, the material of said bracket in the provision of said opening being struck outwardly to provide a pair of outwardly positioned jaws adapted for engaging the guide member on opposite sides thereof at different elevations to provide an adjustable gripping action to support the article in differently adjusted positions.

3. As an article of manufacture, a bracket arm having an opening therein with jaws extending outwardly from the arm in the same direction upon opposite marginal edges of said opening, and resilient gripping sleeves for engaging of said jaws therein.

ORREN C. POOLE, Jr.